United States Patent Office 3,787,398
Patented Jan. 22, 1974

3,787,398
3,4-DIHYDRO-2-(2-HYDROXY)ETHYL-1-(R-AMINO)-
PYRAZINO[1,2-b] - 1,2 - BENZOTHIAZIN-11(2H)-
ONE 6,6-DIOXIDES
Chris Royce Rasmussen, Ambler, Pa., assignor to
McNeil Laboratories, Inc.
No Drawing. Filed Oct. 2, 1972, Ser. No. 294,116
Int. Cl. C07d 93/02
U.S. Cl. 260—243 R       4 Claims

ABSTRACT OF THE DISCLOSURE

The compounds herein are 3,4-dihydro-2-(2-hydroxy)ethyl - 1 - (R-amino)-pyrazino[1,2-b]-1,2-benzothiazin-11(2H)-one 6,6-dioxides, useful as anti-inflammatory agents and for other pharmacological properties.

---

This invention relates to novel benzothiazin-11-one 6,6-dioxides and, more particularly, to certain 3,4-dihydro-2-(2 - hydroxy)ethyl-1-(R-amino)-pyrazino[1,2-b]-1,2-benzothiazin-11(2H)-one 6,6-dioxides and the preparation thereof. These novel compounds may be structurally represented as follows:

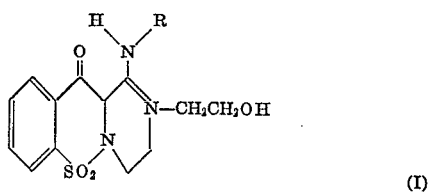

(I)

wherein R is a member selected from the group consisting of hydrogen, loweralkyl, diloweralkylaminoloweralkyl, aralkyl, and substituted aralkyl.

As used herein, "lower alkyl" and "lower alkoxy" may be straight or branched chained saturated hydrocarbons having from 1 to about 5 carbon atoms, such as, methyl, ethyl, propyl, isopropyl, butyl, pentyl, sec-butyl, and the like alkyls, and, respectively, the corresponding alkoxys, such as methoxy, ethoxy, propoxy, isopropoxy, and the like. The term "aralkyl" preferably means a phenyl lower alkyl, such as, for example, benzyl, phenethyl, and the like.

The term "substituted aralkyl" preferably means an aralkyl, as previously defined, substituted with one or more members selected from the group consisting of halo, loweralkyl, and loweralkoxy, such as, for example, 2-bromophenethyl; 2,6-dichlorophenethyl; 4-methoxyphenethyl; 3,4-diethoxyphenethyl; 3-methyl-4-methoxyphenethyl; 2 - chlorobenzyl; 2,6-dibromobenzyl; 4-ethoxybenzyl; 3,4-dimethoxybenzyl; 3-methyl-4-methoxybenzyl; and the like. As used herein, "halo" means fluoro, chloro, bromo, and iodo.

The compounds of Formula I are prepared by reacting (1,2,3,4 - tetrahydro - 11-hydroxy-1-oxopyrazino[1,2-b]-1,2-benzothiazin-2-yl)ethyl methanesulfonate 6,6-dioxide (II) with a large molar excess of aqueous ammonia (for R=H) or with a 1–2 molar excess of an appropriate amine of formula H$_2$NR (for R≠H) dissolved in a suitable organic solvent such as a lower alkanol, e.g., methanol, ethanol, propanol, isopropanol, and the like; an ether, e.g., ethyl ether, tetrahydrofuran, dioxane, and the like; a chlorinated lower alkane, e.g., dichloromethane, chloroform, carbon tetrachloride, and the like; an aromatic hydrocarbon, e.g., benzene, toluene, xylene, and the like; dimethylsulfoxide; dimethylformamide; and the like. Elevated temperatures may be favorably employed in the reactions with amines.

The foregoing reaction may be illustrated by the following:

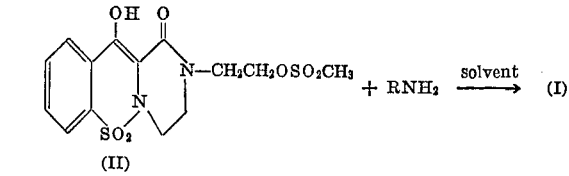

A second method of preparing the compounds of this invention (for R≠H) is by reaction of 2,3,5,6-tetrahydro-13H - oxazolo[2',3':3,4]pyrazino[1,2-b]-1,2-benzothiazin-13-one 8,8-dioxide (III) with one molar equivalent of an appropriate primary amine of formula H$_2$NR in a similar solvent to those described above. Again, elevated temperatures may be employed. This second method may be illustrated by the following:

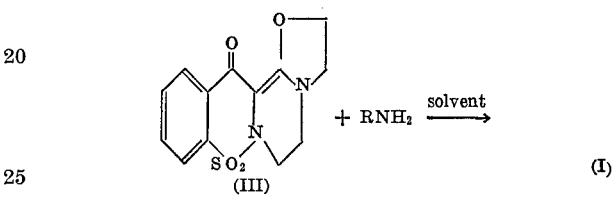

The starting compounds of Formulas II and III are described in my copending application Ser. No. 294,126, entitled "Novel 1,2-Benzothiazine Dioxides and Precursors Therefor," filed on the same date as the instant application.

The Compounds I of this invention are useful for their pharmacological properties. They have been observed to possess anti-inflammatory activity as demonstrated in the conventional kaolin-induced rat paw edema assay when orally administered at doses of about 100 mg./kg. body weight. For example, when R=H, 14–37% inhibition is observed; when R=CH$_3$, 20–44% inhibition is observed; and when R=CH$_2$CH$_2$C$_6$H$_5$, 8–32% inhibition is observed.

Selective enzyme inhibition in vitro has also been observed for the subject Compounds I. For example, when R=CH$_2$CH$_2$C$_6$H$_5$, inhibition of tyrosine hydroxylase and histidine decarboxylase at a concentration of about 0.001 molar is observed. In addition, hypotensive activity has also been observed. For example, when R=H, oral doses of about 50 mg./kg. body weight in the unanesthetized dog and i.v. doses of 5–10 mg./kg. body weight in the anesthetized dog have been observed to cause a decrease in blood pressure, generally on the order of about 35 mm. Hg and 40–100 mm. Hg, respectively, for a period of greater than one hour.

The following examples are intended to illustrate, but not to limit, the scope of the present invention.

EXAMPLE I

1 - amino - 3,4 - dihydro-2-(2-hydroxy)ethylpyrazino[1,2-b]-1,2-benzothiazin-11-one 6,6-dioxide.—To 0.5 1. of rapidly stirred 28% aqueous ammonia is added 58.26 g. (0.15 mole) of 1,2,3,4-tetrahydro-11-hydroxy-1-oxopyrazino[1,2-b]-1,2-benzothiazin-2-yl)ethyl methanesulfonate 6,6-dioxide. The resulting suspension is stirred for several hours at ambient temperatures, at the end of which time the product is collected, washed with water, and dried. Fractional crystallization of this product from methanol and chloroform-95% ethanol yields the desired product, 1 - amino-3,4-dihydro-2-(2-hydroxy)ethylpyrazino[1,2-b]-1,2 - benzothiazin-11-one 6,6-dioxide, M.P. 204–206° C. dec.

*Analysis.*—Calcd. for C$_{13}$H$_{15}$N$_3$O$_4$S (percent): C, 50.47; H, 4.89; N, 13.58; S, 10.37. Found (percent): C, 50.32; H, 4.99; N, 13.53; S, 10.35.

EXAMPLE II 3,4 - dihyro-2-(2-hydroxy)ethyl-1-methylaminopyrazino[1,2-b] - 1,2-benzothiazin-11(2H)-one 6,6-dioxide.—To about 100 ml. of a saturated solution of anhydrous methylamine in dimethylformamide is added 20.0 g. (0.0515 mole) of (1,2,3,4 - tetrahydro-11-hydroxy-1-oxopyrazino[1,2-b]-1,2-benzothiazin-2-yl)ethyl methanesulfonate 6,6-dioxide. After solution is complete, the solution is again saturated with methylamine and is then warmed on a steam bath for 1.5 hours. After the solution has stood for about 15 hours, the solvent and excess amine are removed in vacuo, water is added to the residue, and the resulting solid is collected. Recrystallization from acetone-water yields the pure product, 3,4-dihydro-2-(2-hydroxy)ethyl-1-methylaminopyrazino[1,2-b] - 1,2-benzothiazin-11(2H)-one 6,6-dioxide, M.P. 174–175° C.

*Analysis.*—Calcd. for $C_{14}H_{17}N_3O_4S$ (percent): C, 52.00; H, 5.30; N, 12.99. Found (percent): C, 51.93; H, 5.33; N, 12.37, 13.32.

EXAMPLE III 3,4 - dihydro - 2 - (2-hydroxy)ethyl-1-(β-phenethyl)-aminopyrazino[1,2-b] - 1,2 - benzothiazin-11-one 6,6-dioxide.—To 1.0 g. (0.0033 mole) of 2,3,5,6-tetrahydro-13H - oxazolo[2',3':3,4]pyrazino[1,2-b]-1,2-benzothiazin-13-one 8,8-dioxide in 15 ml. of dimethylformamide is added 0.4 g. (0.0033 mole) of β-phenethylamine. The mixture is heated on the steam bath for two hours and is then allowed to stand for about 15 hours. After the solvent has been removed in vacuo, the residue is triturated with acetone to yield the product, 3,4-dihydro-2-(2-hydroxy)ethyl - 1 - (β-phenethyl)aminopyrazino[1,2-b]-1,2-benzothiazin-11-one 6,6-dioxide, M.P. 144–146° C.

*Analysis.*—Calcd. for $C_{21}H_{23}N_3O_4S$ (percent): C, 61.00; H, 5.61; N, 10.16; S, 7.76. Found (percent): C, 60.97; H, 5.66; N, 10.17; S, 7.75.

EXAMPLE IV

1 - ethylamino - 3,4-dihyro-2-(2-hydroxy)ethylpyrazino[1,2-b]-1,2-benzothiazin-11(2H)-one 6,6-dioxide.—To a solution of 11.3 g. (0.25 mole) of anhydrous ethylamine in 100 ml. dimethylformamide is added 20.0 g. (0.0515 mole) of (1,2,3,4-tetrahydro-11-hydroxy - 1 - oxopyrazino[1,2-b] - 1,2-benzothiazine-2-yl)ethyl methanesulfonate 6,6-dioxide. After solution is complete, the whole is warmed for several hours on a steam bath and is then allowed to stand for about 15 hours. After the solvent and excess amine have been removed in vacuo, water is added to the residue, and the resulting product, 1-ethylamino-3,4 - dihydro-2-(2-hydroxy)ethylpyrazino[1,2-b]-1,2-benzothiazin-11(2H)-one 6,6-dioxide, is collected and recrystallized from acetone-water.

EXAMPLE V

1 - n-butylamino-3,4-dihydro-2-(2-hydroxy)ethylpyrazino[1,2-b] - 1,2-benzothiazin-11-one 6,6-dioxide is obtained by repeating the procedure of Example IV except that an equivalent amount of n-butylamine is substituted for the ethylamine used therein.

EXAMPLE VI 1-benzylamino - 3,4 - dihydro-2-(2-hydroxy)ethylpyrazino[1,2-b]-benzothiazin-11-one 6,6-dioxide is obtained by repeating the procedure of Example IV except that an equivalent amount of benzylamine is substituted for the ethylamine used therein.

EXAMPLE VII 1-(3-dimethylaminopropyl)amino - 3,4 - dihydro-2-(2-hydroxy)ethylpyrazino[1,2-b] - 1,2 - benzothiazin-11-one 6,6-dioxide is obtained by repeating the procedure of Example IV except that an equivalent amount of 3-dimethylaminopropylamine is substituted for the ethylamine used therein.

EXAMPLE VIII

The procedure of Example III is repeated except that an equivalent amount of each of the following substituted phenethyl amines:

4-bromo-β-phenethylamine;
2,6-dichloro-β-phenethylamine;
4-methoxy-β-phenethylamine;
3,4-diethoxy-β-phenethylamine; and
3-methyl-4-methoxy-β-phenethylamine is substituted for the unsubstituted β-phenethylamine used therein to yield, as respective products, the following compounds:

1-(4-bromo-β-phenethylamino)-3,4-dihydro-2-(2-hydroxy)ethylpyrazino[1,2-b]-1,2-benzothiazin-11-one 6,6-dioxide;
1-(2,6-dichloro-β-phenethylamino)-3,4-dihydro-2-(2-hydroxy)ethylpyrazino[1,2-b]-1,2-benzothiazin-11-one 6,6-dioxide;
3,4-dihydro-2-(2-hydroxy)ethyl-1-(4-methoxy-β-phenethylamino)pyrazino[1,2-b]benzothiazin-11-one 6,6-dioxide;
1-(3,4-diethoxy-β-phenethylamino)-3,4-dihydro-2-(2-hydroxy)ethylpyrazino[1,2-b]-1,2-benzothiazin-11-one 6,6-dioxide; and
3,4-dihydro-2-(2-hydroxy)ethyl-1-(3-methyl-4-methoxy-β-phenethylamino)pyrazino[1,2-b]-1,2-benzothiazin-11-one 6,6-dioxide.

EXAMPLE IX

The procedure of Example III is repeated except that an equivalent amount of each of the following substituted benzylamines:

2-chlorobenzylamine;
2,6-dibromobenzylamine;
4-ethoxybenzylamine;
3,4-dimethoxybenzylamine; and
3-methyl-4-methoxybenzylamine is substituted for the β-phenethylamine used therein to yield, as respective products, the following compounds:

1-(2-chlorobenzylamino)-3,4-dihydro-2-(2hydroxy)ethylpyrazino[1,2-b]-1,2-benzothiazine-11-one 6,6-dioxide;
1-(2,6-dibromobenzylamino)-3,4-dihydro-2-(2-hydroxy)ethylpyrazino[1,2-b]-1,2-benzothiazine-11-one 6,6-dioxide;
3,4-dihydro-1-(4-ethoxybenzylamino)-2-(2-hydroxy)ethylpyrazino[1,2-b]-1,2-benzothiazine-11-one 6,6-dioxide;
3,4-dihydro-1-(3,4-dimethoxybenzylamino)-2-(2-hydroxy)ethylpyrazino[1,2-b]-1,2-benzothiazin-11-one 6,6-dioxide; and
3,4-dihydro-2-(2-hydroxy)ethyl-1-(3-methyl-4-methoxybenzylamino)pyrazino[1,2-b]-1,2-benzothiazin-11-one 6,6-dioxide.

What is claimed is:

1. A 3,4-dihydro-2-(2-hydroxy)ethylpyrazino[1,2-b]-1,2-benzothiazin-11(2H)-one 6,6-dioxide having the formula:

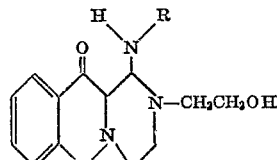

wherein R is a member selected from the group consisting of hydrogen, loweralkyl, diloweralkylaminoloweralkyl, benzyl, benzyl substituted with one to two members selected from the group consisting of halo, loweralkyl and loweralkoxy, phenethyl, and phenethyl substituted with one to two members selected from the group consisting of halo, loweralkyl and loweralkoxy.

2. 1 - amino - 3,4 - dihydro - 2 - (2 - hydroxy)ethyl-pyrazino[1,2-b]-1,2-benzothiazin-11-one 6,6-dioxide.

3. 3,4 - dihydro - 2 - (2 - hydroxy)ethyl - 1 - methylaminopyrazino[1,2-b]-1,2 - benzothiazin - 11-one 6,6 - dioxide.

4. 3,4 - dihydro - 2 - (2 - hydroxy)ethyl - 1 - ($\beta$ - phenethyl)aminopyrazino[1,2-b]-benzothiazin-11 - one 6,6 - dioxide.

References Cited
UNITED STATES PATENTS 3,408,347  10/1968  Shavel et al. _____ 260—243

JOHN M. FORD, Primary Examiner

U.S. Cl. X.R.

424—246